United States Patent

Booher et al.

[11] Patent Number: 5,807,039
[45] Date of Patent: Sep. 15, 1998

[54] DRILL BIT

[75] Inventors: Gerald D. Booher, Greenville, N.C.; Juergen Wiker, Louisville; Philip O. McKinney, LaGrange, both of Ky.

[73] Assignee: Credo Tool Company, Woodburn, Oreg.

[21] Appl. No.: 799,836

[22] Filed: Feb. 13, 1997

[51] Int. Cl.⁶ .................................................. B23B 51/02
[52] U.S. Cl. ........................... 408/224; 408/226; 408/230
[58] Field of Search .................................... 408/214, 215, 408/223, 224, 226, 227, 230

[56] References Cited

U.S. PATENT DOCUMENTS

| | | | |
|---|---|---|---|
| 2,662,428 | 12/1953 | Mueller | 408/224 |
| 2,735,116 | 2/1956 | Mueller | 408/224 |
| 3,665,801 | 5/1972 | Gutshall | 408/230 |
| 4,561,813 | 12/1985 | Schneider . | |
| 5,074,728 | 12/1991 | Hau . | |
| 5,452,971 | 9/1995 | Nevills . | |

FOREIGN PATENT DOCUMENTS

| | | | |
|---|---|---|---|
| 252135 | 5/1988 | Czechoslovakia . | |
| 75811 | 3/1992 | Japan | 408/227 |
| 50313 | 3/1993 | Japan | 408/230 |
| 57517 | 3/1993 | Japan | 408/230 |
| 665979 | 6/1988 | Switzerland | 408/230 |
| 567560 | 8/1977 | U.S.S.R. | 408/230 |
| 212618 | 3/1924 | United Kingdom | 408/223 |

*Primary Examiner*—Daniel W. Howell
*Attorney, Agent, or Firm*—Polster, Leider, Woodruff & Lucchesi

[57] ABSTRACT

A wood drill with a point, cutting lips at the point, a shank and a body. The body having lands defining between them flutes. The flutes have a high helix reach extending from a distance from the cutting lips toward the shank, an intermediate helix reach extending from the high helix reach toward the shank and a low helix reach extending between the intermediate reach and the shank. The drill has screw threads in a peripheral surface of the lands from a point adjacent the cutting lips a distance toward the shank less than the length of the high helix reach of the flutes.

10 Claims, 1 Drawing Sheet

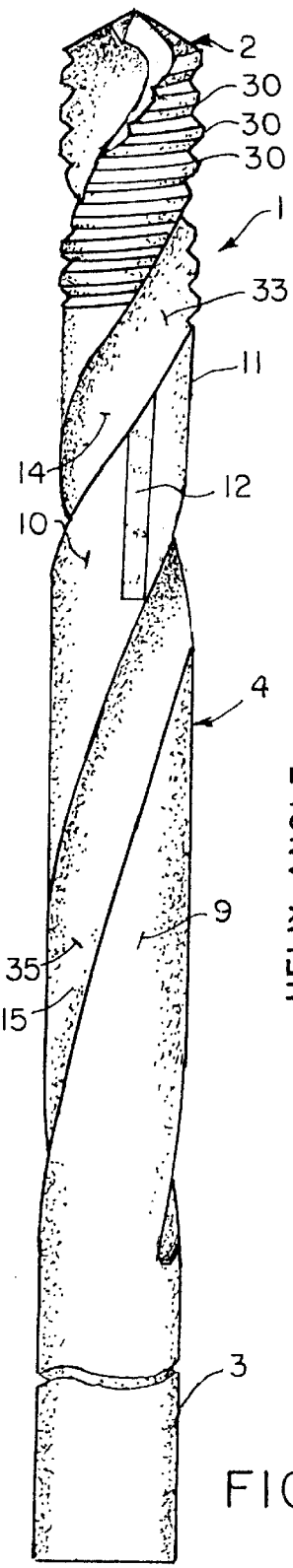
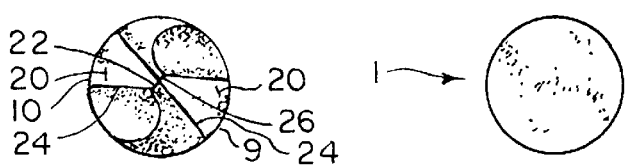
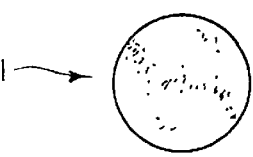
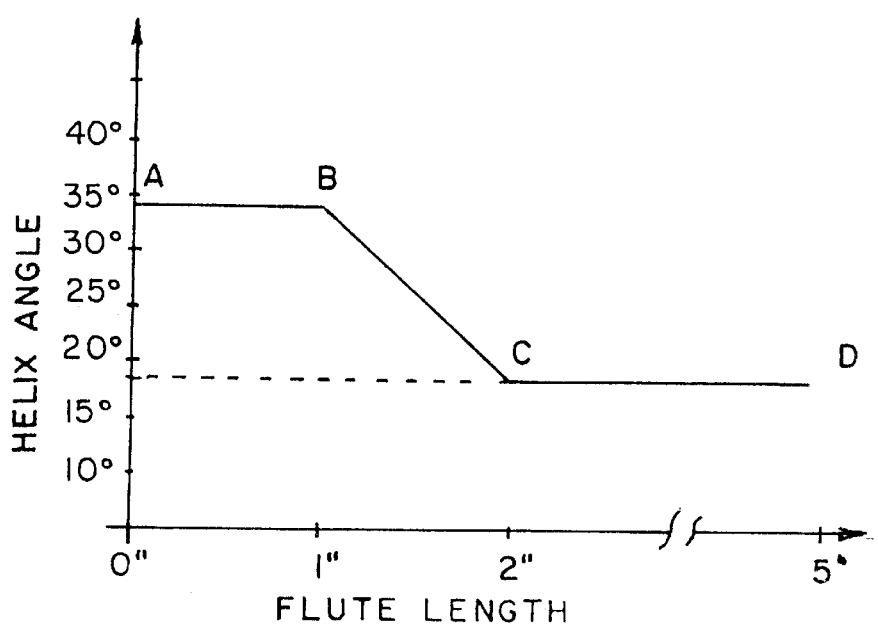
FIG. 1
FIG. 2
FIG. 3
FIG. 4

DRILL BIT

CROSS-REFERENCE TO RELATED APPLICATIONS

STATEMENT REGARDING FEDERALLY SPONSORED RESEARCH OR DEVELOPMENT

Not applicable.

BACKGROUND OF THE INVENTION

A screw with a drill point and helical flutes is disclosed in Han U.S. Pat. No. 5,074,728. The function of the Han threads is to secure the screw "in a wall or article to be fastened", and to that end, the screw thread begins at a substantial distance from the drill point and ends close by the head of the screw or bolt. A wood bit with variable helix flutes is shown in Czech Patent 252,135 but in the Czech patent, the flute helix angle is low near the point, and becomes higher farther up the shaft.

One of the objects of this invention is to provide a twist drill for drilling holes in wood, which is self feeding and which clears chips effectively.

Other objects will become apparent to those skilled in the art in light of the following description and accompanying drawings.

BRIEF SUMMARY OF THE INVENTION

In accordance with this invention, generally stated, a wood twist drill is provided, having a point, cutting lips at the point, a shank and a body, the body having a plurality of lands defining between them a plurality of flutes. Screw threads are formed in a peripheral surface of the lands from a point immediately adjacent the cutting lips to a point a short distance toward the shank as compared with the length of the drill. A high helix reach of the flutes extends a distance from the cutting lips toward the shank, an intermediate helix reach of the flute extends from the high helix reach toward the shank, and a low helix reach of the flutes extends from the intermediate reach to the shank. The distance from the cutting lips of the point to the end of the screw thread section nearest the shank is less than the reach of the high helix reach of the flutes. Preferably, the lands immediately adjacent the end of the screw thread region have a relieved portion, terminating in a margin. The screw threads are preferably not sharp edged, but of the Acme thread type, which still makes the drill substantially self-feeding. The variable pitch flutes, beginning with a high helix angle, are substantially self-clearing, because the capacity of the flutes and their lead increases in the direction toward the shank.

BRIEF DESCRIPTION OF THE SEVERAL VIEWS OF THE DRAWINGS

In the drawings, FIG. 1 is a view in side elevation of one embodiment of the drill of this invention;

FIG. 2 is a top plan view;

FIG. 3 is a bottom plan view; and

FIG. 4 is a graph showing the helix angles of the flutes versus the flute length in the illustrative embodiment of drill shown and described.

DETAILED DESCRIPTION OF THE INVENTION

In the drawing, reference numeral 1 indicates one embodiment of twist drill of this invention. The drill 1 has a point 2, a straight shank 3, and a body 4. Lands 9 and 10 are formed in the body. The lands 9 and 10 define between them flutes 14 and 15.

The lands end at the point 2, ends 20 of the lands having on one edge a lip 24 extending from a chisel edge 26 formed at the end of a web 22 at the meeting edges of the lands, to the outer peripheral edge of the lands. The drill of the illustrative embodiment is a split-point drill, the web and chisel edge being thinned drastically at the point, as is conventional with split-point drills.

Threads 30 are formed in the peripheral surfaces of the lands 9 and 10, extending from the outer edges of the lips 24 to a land relief area 11. The threads 30 can be class 2G Acme threads, although other threads can be used.

From the lips 24 through the relief area 1 1, the flutes 14 and 15 are in a high helix reach 33, where the helix angle is high. At the shank end of the flutes, the flutes 14 and 15 are in a low helix reach 35, with a low helix angle. Between the high helix reach 33 and the low helix reach 35 is an intermediate helix reach in which the helix angle is graduated from the high helix angle to the low helix angle as illustrated in FIG. 4. In the illustrative embodiment shown, with a ⅜" drill 6 inches long, with a flute length of 5 inches, the helix angle from A to B is 34°, and from C to D, 17°. As can be seen from the graph, the high helix reach of the drill extends from the point (A) 1 inch, the intermediate reach from B to C extends another inch, and the low helix reach extends from C, 3 inches to the shank (D).

The helix angles can be varied from those of the illustrative embodiment. For example the high helix reach can have a helix angle in the range of 30° to 38°, and the low helix reach, a helix angle in the range of 14° to 20°. The total length of the drill bit varies, depending upon the diameter. Accordingly, the distances between points A and B and between B and C will vary as will be apparent to those skilled in the art. Merely by way of example, the distance between point A and point B may vary between 0" and 1.5", and between point B and point C, between 0.5" and 1.75".

In forming the drill bit, in this illustrative embodiment with a 3/8" threaded wood drill bit, a lead screw with a 1.75 lead at the beginning (A) and a 3.75 lead at the end (C) is used. The helix angles are calculated as follows:

$$H = \arctan(2 p i \times r / L)$$

where H is the helix angle, R is the radius of the drill bit, and L is the lead of the lead screw (where 1.75 means that the flute turns one revolution in a length of 1.75 inches, and 3.75 means that the flute turns one revolution in a length of 3.75 inches).

The feed rate of a drill without screw threads is determined largely by the helix angle of the flutes at the drill point. In the drill of the present invention, the feed rate is determined by the pitch of the screw threads. With 12 threads to the inch, the number in the illustrative embodiment (the number in the drawing being less, merely for the sake of clarity in illustration), the feed rate will be more aggressive than with 20 threads to the inch, for example. The number of teeth per inch to be used will depend to some extent upon the use to which the drill is to be put, i.e., the hardness and density of the wood, the nature of the grain structure or other characteristic of the wood to be drilled.

Because the screw threads make the drill bit self feeding, little or no axial force is required. The drill bit of this invention is intended primarily for drilling holes all the way through a work piece, not for forming blind holes. In drilling a blind hole with the bit, it will be easiest to reverse the rotation of the drill bit to back it out, although the preferred type of screw thread will not anchor the bit in the hole, if pulling force is exerted on it.

As has been indicated above, the provision of variable pitch flutes, with the high flute angle at the point, helps both to clear the chips at the point, and to clear the chips from the hole, permitting faster progress of the drill through the workpiece.

Numerous variations in the construction of the drill of this invention, within the scope of the appended claims, will become apparent to those skilled in the art. Merely by way of illustration, the type of shank can be varied, as, for example a taper shank, or a square shank. The material from which the drill is made can be any conventional wood drill material, such as molybdenum-type high-speed steel or cobalt type steel. The web at the point can be thinned less, to leave a greater chisel edge, although the split-point construction shown and described has a number of advantages. The lands can be relieved all the way from the end of the screw threads to the shank, or provided with no relief at all. In the former, the drill is more easily withdrawn; in the latter, the sharp edges of the lands serve to ream the bore, regardless of the length of the bore, giving a smooth bore wall surface all the way from the shank end of the screw threads to the mouth of the bore. The relief shown and described has some of the virtues of both. The threads can be of other types than Acme threads, although the Acme thread is commonly used to impart traversing movement to tools, and has the virtue of exerting less radial bursting pressure than some other types. A stub Acme thread can be used if desired, or such threads as American Standard pipe threads of various types. Although the ranges given are the preferred ranges, depending upon the characteristics of the wood to be drilled, the helix angles can be greater or less than the ranges given. Although the drill bit has been illustrated as a right hand drill, it can be made left handed just as easily. These variations are merely illustrative.

We claim:

1. A wood drill having a point, cutting lips at said point, a shank and a body, said body having a plurality of lands defining between them a plurality of flutes, and screw threads in peripheral surfaces of said lands from a point immediately adjacent said cutting lips a distance toward said shank, a high helix reach of said flutes extending a distance from said cutting lips toward said shank having a first helix angle, and a low helix reach of said flutes extending between said high helix reach and said shank, having a lower helix angle than said first helix angle.

2. The drill of claim 1 wherein said lands from a shank end of said screw threads to a point adjacent a shank end of said high helix reach have a relieved portion terminating at a shank end in a margin.

3. The drill of claim 1 wherein the high helix reach has a helix angle of about 30° to 38°, and said low helix reach has a helix angle of about 14° to 20°.

4. The drill of claim 3 wherein said high helix reach has a helix angle of about 34° and said low helix reach has a helix angle of about 17°.

5. The drill of claim 3 wherein said high helix reach and said low helix reach are spaced from one another, and the helix angle of said flutes in an intermediate reach is graduated between the angle of said high helix reach and the angle of said low helix reach.

6. The drill of claim 1 wherein said screw thread is an Acme thread.

7. A split-point two flute wood drill having a point, cutting lips at said point, a shank and a body, said body having two lands defining between them two flutes, and screw threads in a peripheral face of said lands, from a point immediately adjacent said cutting lips a distance toward said shank; a high helix reach of said flutes extending in a direction toward said shank, an intermediate reach of said flutes extending from said high helix reach toward said shank, and a low helix reach of said flutes extending between said intermediate reach of said flutes and said shank, said high helix flutes having a helix angle between about 30° to 38°, said low helix flutes having a helix angle of about 14° to 20°, and said intermediate helix flutes having a helix angle graduated between said high helix angle and said low helix angle, said screw threads extending a short distance from said lips toward said shank as compared with the length of said high helix reach, and said high helix reach having a relieved portion beginning at a shank end of said screw threads.

8. A wood drill bit having a point, cutting lips at said point, a shank and a body, said body having a plurality of lands defining between them a plurality of flutes and screw threads in a peripheral surface of said lands from a point adjacent said cutting lips a distance towards said shank short as compared to the length of said flutes.

9. The drill of claim 8 wherein said flutes have a high helix reach extending from said cutting lips toward said shank, and a low helix reach between said high helix reach and said shank.

10. The drill bit of claim 9 wherein said lands have a relieved portion extending from a shank end of said screw threads and terminating in a margin within said high helix reach of said lands.

* * * * *